United States Patent [19]
Burner et al.

[11] Patent Number: 5,197,679
[45] Date of Patent: Mar. 30, 1993

[54] CORE STRIPPER

[75] Inventors: Rex E. Burner, Des Moines; Larry C. Kisting, Grimes; David Fehrer, Indianola, all of Iowa

[73] Assignee: R.R. Donnelley & Sons Company, Chicago, Ill.

[21] Appl. No.: 693,673

[22] Filed: Apr. 30, 1991

[51] Int. Cl.$^5$ .............................................. B02C 15/00
[52] U.S. Cl. ..................................... 241/36; 241/105; 241/106; 242/68.7
[58] Field of Search ................. 241/36, 103, 105, 106, 241/200; 242/68.7, 78.7, 54 R; 148/622

[56] References Cited
U.S. PATENT DOCUMENTS
2,369,347  2/1945  Gibson et al. ..................... 242/68.7

*Primary Examiner*—Douglas D. Watts
*Attorney, Agent, or Firm*—Arnold, White & Durkee

[57] ABSTRACT

The present invention provides an apparatus to strip material from material cores. The apparatus of the invention comprises a frame; a belt attached to the frame; means for rotationally driving the belt; and means for biasing material to be stripped against the belt. According to the invention, the belt is an endless conveying belt, driven by a motor, gear box controlled with an A/C variable frequency drive. The material being stripped is biased against the belt by a plurality of positioning members rotatably attached to the frame. The positioning members are spaced at intervals along the length of the conveying belt such that the distance between ecah positioning member is greater than the diameter of the expiring material core being stripped. Each positioning member and the rotating belt meet to create a nip. An expiring core is placed on the rotating conveying belt and the leasing edge of the material is self-threaded into the nip. The material is then continuously drawn into and through the nip, unwinding the material core. The nip pulls the material from the expiring material core. The apparatus can be constructed to provide several nips along its length, each nip pulling the remaining material from an expiring material core. The stripped core can be removed and another unstripped core placed on the rotating belt. This eliminates the need to interrupt the run mode. The material, once stripped from the core, proceeds along the conveying belt and can be gathered manually or is preferably conveyed directly into a shredding and baling device.

15 Claims, 3 Drawing Sheets

CORE STRIPPER

BACKGROUND OF THE INVENTION a. Field of the Invention

The present invention is related generally to the reclamation of materials; and more particularly, to an apparatus for reclaiming the material remaining on nearly expired material cores.

b. Background of the Art

Material reclamation reduces material expenditures, increases profits, and conserves natural resources. In the printing industry, paper is one material that is reclaimed and recycled.

Materials, such as textiles, plastics sheets, metal foils, and paper are commonly supplied to industrial users as large material rolls. These material rolls are used in large-scale commercial manufacturing. For example, books, periodicals, and newspapers are printed on large industrial printing presses. Large rolls of paper supply the paper to these presses. These paper rolls have diameters of up to 40 inches, and weigh as much as 2500 pounds. The paper is wound on a cylinder made of cardboard fiber or steel that is the exact width of the roll. This is commonly referred to as the core.

In industrial printing applications, the paper roll is positioned on an air shaft or between chucks at the roll changers and the leading edge of the paper from the paper roll is threaded through the printing press. The press then, when operating, automatically unwinds the bulk of the paper from the paper roll. When the paper roll is nearly exhausted of paper, e.g., when from about one-half to about on inch of paper remains wound about the metal or cardboard core which is at the center of the paper roll, the expiring paper roll is replaced with a fresh paper roll. The paper remaining on the expiring paper roll is then reclaimed. The metal cylinder onto which the paper is wound is also salvaged and recycled.

Occasionally, entire paper rolls are damaged during milling or subsequent handling. Damaged or inferior quality paper is unsatisfactory for most printing purposes. Similarly to expiring paper cores, these entire paper rolls are also reclaimed.

One method of reclaiming the paper remaining on a paper core is to simply manually cut it off the metal or cardboard core with a sharp knife or razor. The paper is then hand fed into a hammer mill which shreds the paper. The shredded paper is subsequently baled and sold to a paper recycler. This process is labor intensive and can be hazardous to workers. Further, it is not practical for reclaiming entire paper rolls.

FIG. 1 shows a device used to reclaim paper from the paper cores. Referring to FIG. 1, the paper core is placed in the cradle between the two unwinding rollers 1 and 2. The leading edge of the paper is pulled off the core by hand and is stuffed in an opening 3 in the paper unwinding wheel 5. A foot pedal control (not shown) activates the drive motor 7. By means of a pulley and wheel assembly 9, the drive motor 7 rotates the unwinding wheel 5 in the direction shown by the arrows. The paper from the paper core winds around the unwinding wheel 5 as it rotates. When the paper is near its end, the paper core must be manually held down against the unwinding rollers 1 and 2 to prevent it from being pulled out of its cradled position. When all the paper is removed, the empty metal or cardboard cylinder is removed and the process is repeated with another expiring core. Once about one-eight of an inch of paper accumulates on the unwinding wheel 5, the device is stopped, and the paper is manually cut off the unwinding wheel 5 with a knife or razor. The paper is then hand fed into a hammer mill for shredding. The shredded paper is subsequently transferred to a baler. About twenty expiring paper cores an hour can be salvaged by one person with this device.

It would be very advantageous to provide an apparatus which strips material, such as paper, from nearly expired material cores quickly and cost effectively. A great advantage would be realized by providing an apparatus which strips several material cores simultaneously. A further advantage would be provided by an apparatus which obviates the need for manually cutting the paper from either the expiring material core or an unwinding wheel. This advantage would reduce injuries in the work place. A still further advantage would be provided by a apparatus which can be operated by one person to strip from one hundred to one hundred fifty material cores per hour. Another and important advantage would be realized by an apparatus which efficiently strips entire or almost entire paper rolls.

SUMMARY OF THE INVENTION

The above-listed advantages are provided by the apparatus of the present invention. The apparatus of the present invention can strip the material from one or several material cores simultaneously. The invention obviates the need for manually cutting the material off the material core or an unwinding wheel. One embodiment of the invention can strip material cores having diameters of up to about 40 inches. The invention can strip from one hundred to several hundred expiring material cores per hour depending on its particular construction and the speed at which it is operated.

The apparatus of the invention comprises a frame; a belt attached to the frame; means for rotationally driving the belt; and means for biasing material to be stripped against the belt. According to one preferred embodiment, the belt is an endless conveying belt, driven by a motor and pulley assembly. The material being stripped is biased against the belt by a plurality of positioning members rotatably attached to the frame. The positioning members are spaced at intervals along the length of the conveying belt such that the distance between each positioning member is greater than the diameter of the material core being stripped. Each positioning member and the rotating belt meet to create a nip. An expiring core is placed on the rotating conveying belt and the leading edge of the material is self-threaded into the nip, the unwinding is counter-clockwise rotation. The material is then continuously drawn into and through the nip, unwinding the material core. The nip pulls the material from the expiring material core. The apparatus can be constructed to provide several nips along its length. Each nip pulls the remaining material from one expiring material core. The material, once stripped from the core, proceeds along the conveying belt and is preferably conveyed directly into a shredding and baling device.

BRIEF DESCRIPTION OF THE DRAWINGS

Other objects and advantages of the invention will become apparent upon reading the following detailed description and upon reference to the drawings in which.

Figure 1:
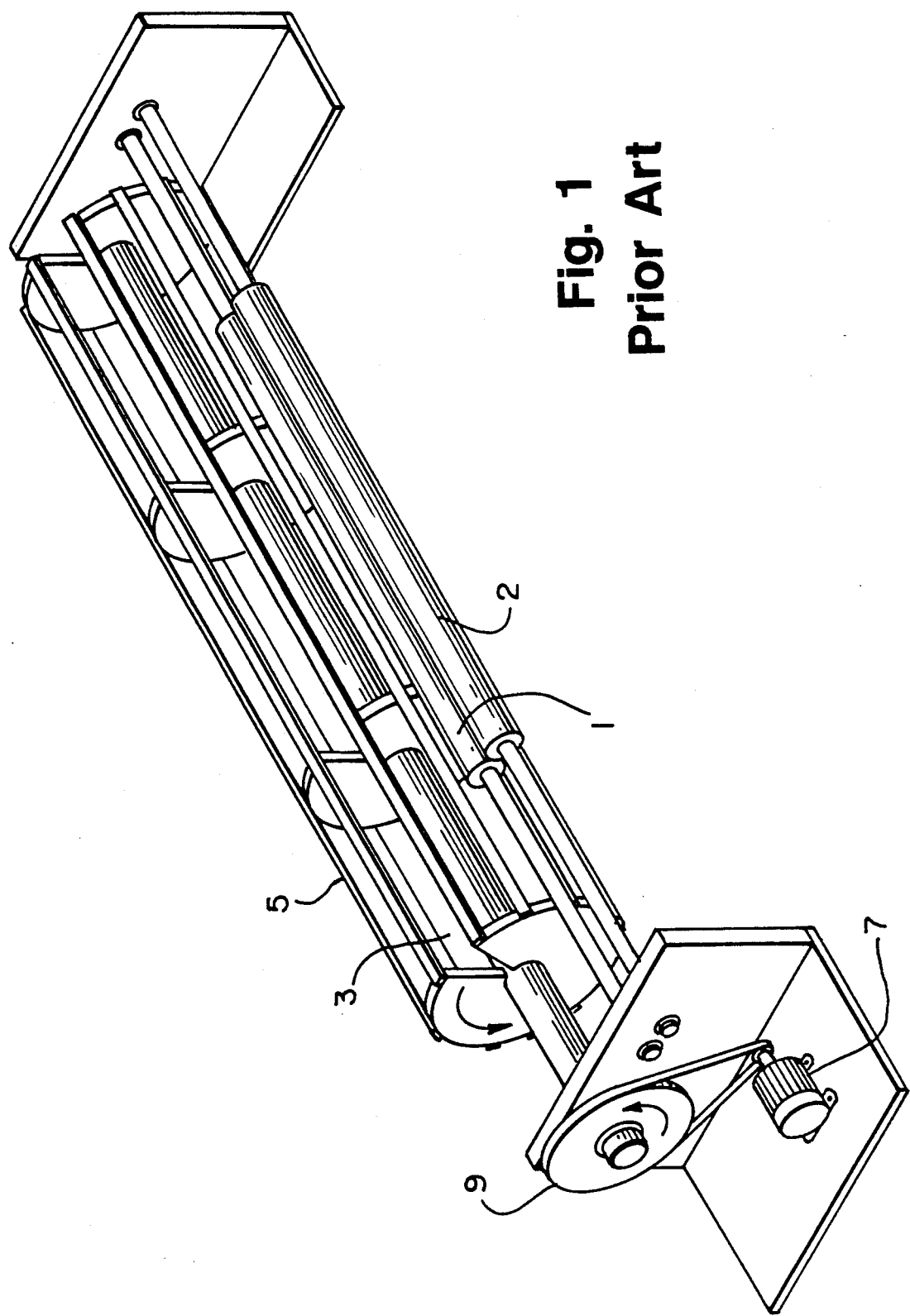
FIG. 1 is a schematic representation of a conventional device for stripping paper from an expiring paper core.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The present invention provides an apparatus which automatically strips the material from a material core. The invention can be constructed to strip one or several material cores simultaneously. The invention greatly increases the number of cores which can be stripped per hour per worker. Depending on the particular construction of the invention and the speed at which the apparatus is operated, from one hundred to one hundred fifty small diameter material cores can be stripped in one hour by one worker. This presents a distinct departure from the prior methods and devices used in material reclamation.

Figure 2:
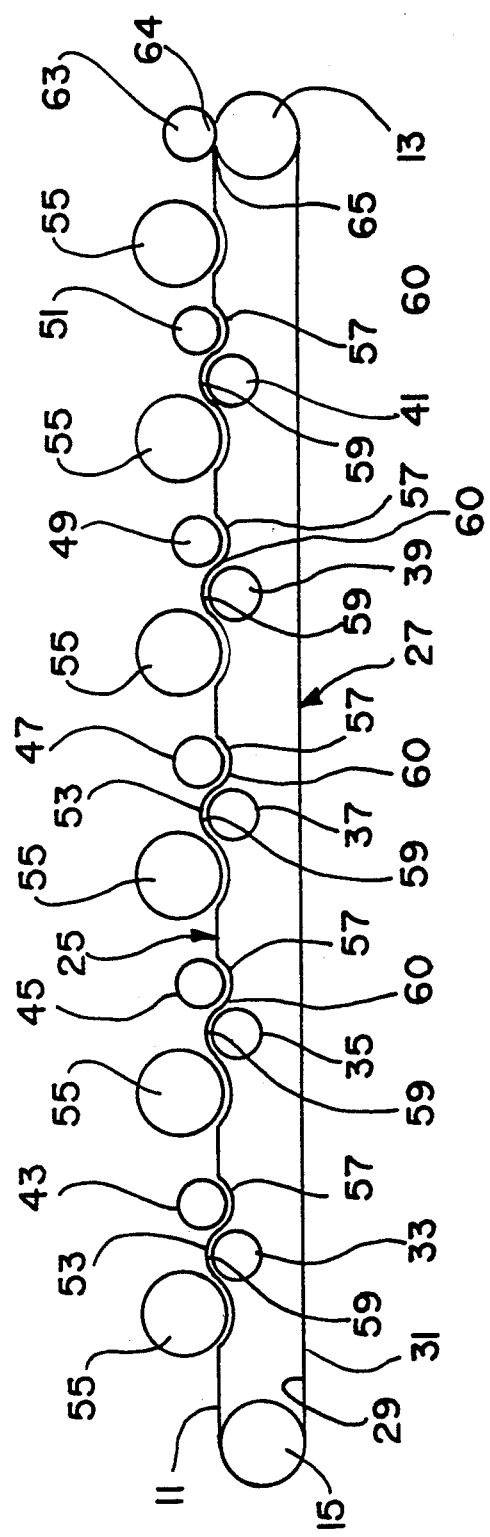
FIG. 2 is a detailed side view of one exemplary embodiment of the invention.
Figure 3:
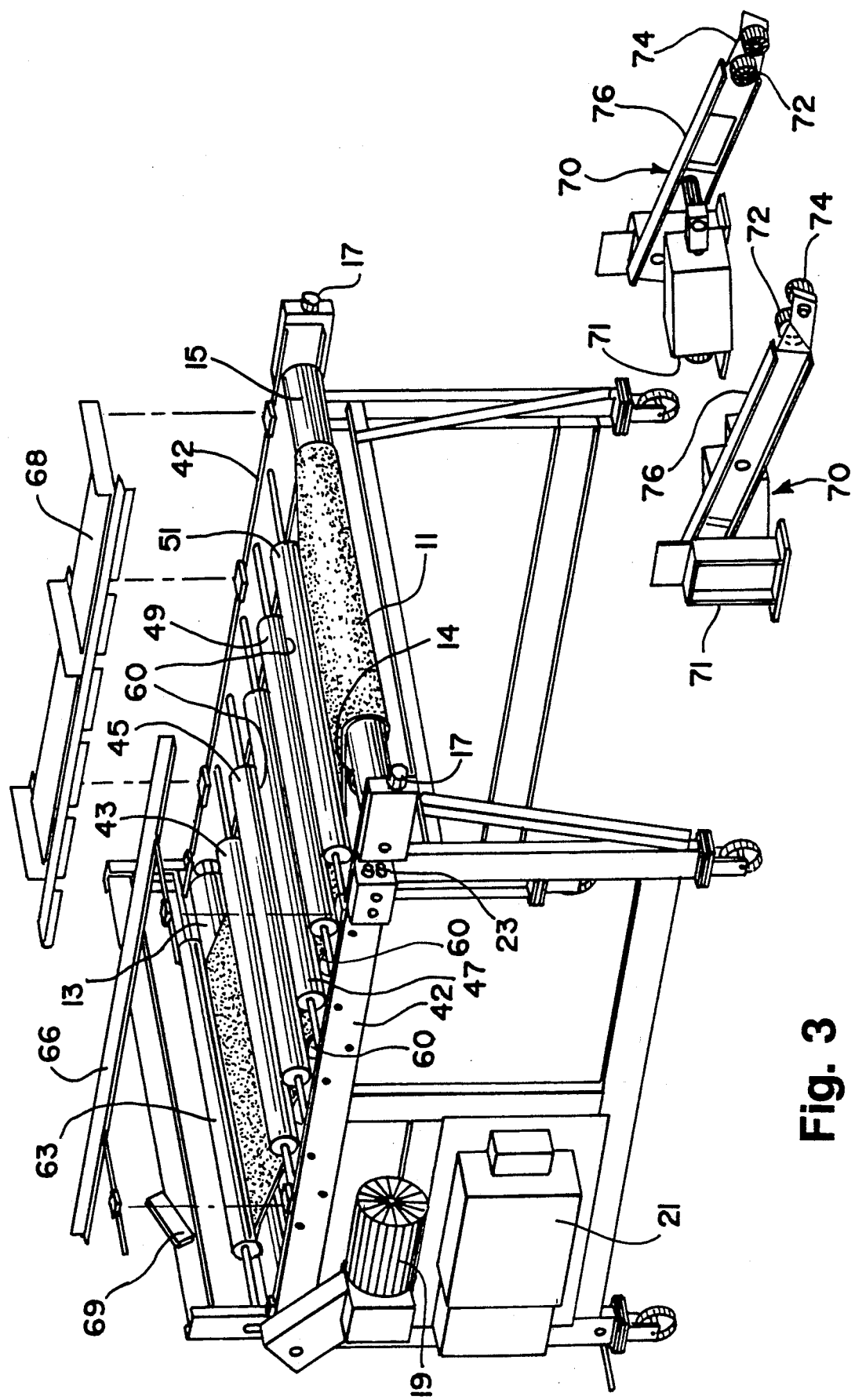
FIG. 3 is a prospective view of the same exemplary embodiment of the invention.

In accordance with the invention, FIGS. 2 and 3 show a conveying belt 11 which is rotationally mounted at one end on a drive transmission cylinder 13 and at the opposite end on a tensioning cylinder 15. A belt tensioner 17 positions the tensioning cylinder 15 a horizontal distance from the drive transmission cylinder 13 to ensure that the conveying belt 11 is taunt and frictionally engages both the drive transmission cylinder 13 and the tensioning cylinder 15.

The conveying belt 11 is rotationally driven by the drive transmission cylinder 13. A belt guide 14 prevents the lateral movement of the conveying belt 11. The drive transmission cylinder 13 is rotated by a driver 19. FIG. 3 shows the drive transmission cylinder 13 and the tensioning cylinder 15 rotationally attached to the frame 42 in the same horizontal plane. Since the tensioning cylinder 15 is rotatable, the rotational drive imparted by the drive transmission cylinder 13 is not impeded. The driver 19 can include a motor and gear assembly or a motor and pulley assembly. A variable speed controller 21, such as an a/c variable speed drive, determines the rate at which the driver 19 rotates the conveying belt 11. The rate at which the conveying belt 11 is driven depends on the particular needs of the operator. Preferable belt surface speeds are from about 50 to about 250 feet/minute. The variable speed controller 21 is responsive to a start, stop and speed control 23 which is manually controlled by the operator.

As shown in FIG. 2, the conveying belt 22 winds around the drive transmission cylinder 13 and the tensioning cylinder 15 to form a top runner 25 and a bottom runner 27. The top runner 25 is that part of the conveying belt 11 which is at any given moment between and above the drive transmission cylinder 13 and the tensioning cylinder 15. Conversely, the bottom runner 27 is that part of the conveying belt 11 which is at any given moment between and below the drive transmission cylinder 13 and the tensioning cylinder 15.

The conveying belt 11 is constructed of a resilient material. Preferably, the conveying belt interior surface 29 and the conveying belt exterior surface 31 are rubberized. Rubberizing the conveying belt surfaces prevents the build up of static electricity which can cause the material being stripped to cling to the conveying belt 11.

In FIG. 2 the top runner 25 is supported by a plurality of support members 33, 35, 37, 39 and 41. The support members are rotatably attached to the frame 42 in a common horizontal plane. The support members 33, 35, 37, 39 and 41 engage and support the interior surface 29 of the conveying belt top runner 25. When, as shown in FIG. 2, the support members 33, 35, 37, 39 and 41 are rollers, resistance to the rotational motion of the conveying belt 11 is minimized.

FIGS. 2 and 3 show a plurality of positioning members 43, 45, 47, 49 and 51 rotatably attached to the frame 42 in a common horizontal plane. The positioning members 43, 45, 47, 49, and 51 are spaced at intervals along the length of the conveying belt 11 such that the distance between each is greater than the diameter of an expiring material core to be stripped. The positioning members 43, 45, 47, 49 and 51 bias the material 53 being stripped from the expiring material core 55 against the exterior surface 31 of the conveying belt top runner 25. The bottom surface 57 of each of the positioning members 43, 45, 47, 49 and 51 lies in a common horizontal plane, adjacent to the top surface 59 of each of the support members 33, 35, 37, 39 and 41. With regard to the direction of motion, the top surface 59 of each of the support members 33, 35, 37, 39 and 41 is situated in the same horizontal plane, adjacent to and slightly ahead of the bottom surface 57 of the corresponding positioning member 43, 45, 47, 49 and 51.

According to the embodiment shown in FIG. 2, the conveying belt 11 winds between the top surface 59 of the support member 39 and the bottom surface 57 of the positioning member 49. The conveying belt 11 is displaced upwardly by the top surface 59 of each support members 33, 35, 37, 39 and 41, and then immediately downwardly by the bottom surface 57 of the positioning members 43, 45, 47, 49 and 51. The arrangement of the positioning members and support members ensures that conveying belt 11 frictionally engage and imparts rotational motion to both the positioning members 43, 45, 47, 49 and 51 and the support members 33, 35, 37, 39 and 41. The frictional engagement of the bottom surface 57 of each positioning member and the top surface 31 of the rotating conveying belt top runner 25 creates a nip 60. The nip 60 pulls the remaining material 53 from the material core 55. The upward displacement of the conveying belt 11 by the top surface 59 of the support members 33, 35, 37, 39 and 41 minimizes the expiring material cores 55 from rolling up against one of the positioning members 43, 45, 47, 49 and 51. The material 53 is pulled through the nip 60 at a rate determined by the surface speed of the conveying belt 11.

FIG. 2 shows the clockwise rotational motion of the conveying belt 11. This motion, shown by the arrows, imparts an equal, but opposite, counterclockwise motion to each positioning member 43, 45, 47, 49 and 51. A counterclockwise motion is also imparted to a rotatable discharge roller 63. The discharge roller 63 is located above the drive transmission cylinder 13. The discharge roller 63 is separated from the drive transmission cylinder 13 by the thickness of the conveying belt 11. A nip 65 is formed at the point where the conveying belt 11 frictionally engages the bottom surface 64 of the rotatable discharge roller 63. The discharge roller 63 is located in a higher horizontal plane than the positioning members 43, 45, 47, 49 and 51. This creates an incline in the top runner 25 which prevents the material core 55 from rolling up against the discharge roller 63.

In one embodiment of the invention shown in FIG. 2, the material cores 55 to be stripped are placed on the clockwise rotating conveying belt 11. The material cores 55 are prevented from moving laterally by guide rails 66 and 68. The leading edge of the material 53 being stripped is self-threaded into the nips 60 and/or 65. The rotation of the conveying belt 11 then continuously draws the material 53 into and through the nips 60 and 65, thereby unwinding the expiring material core 55. As shown in FIG. 2, the apparatus can be constructed to provide several nips 60 along its length. Each nip 60 urges the remaining material 53 from the expiring material core 55. Thus, several expiring cores 55 can be stripped simultaneously. The nip 65 urges and discharges the unwound materials 53 from the conveying belt 11. The apparatus is preferably constructed so that the nip 65 discharges the stripped material directly into a material shredding and baling device. An electric eye or discharge photo sensor 69 is included in one embodiment downstream of the discharge nip 65 to detect when paper is being discharged from the apparatus. The discharge photo sensor 69 can be coupled with a circuit which, when paper discharge is detected, will start the paper shredding and baling device.

If the material 53 being stripped is paper, then the paper is urged from the paper core by a nip 60. The stripped paper then proceeds along the length of the conveying belt 11, possibly through other nips 60. Once it passes through nip 65 it can be conveyed directly into a shredding and baling device. Preferably, the apparatus is constructed so that the conveying belt 11 conveys the stripped paper through nip 65 directly into a paper shredding and baling device.

According to another embodiment of the invention, The apparatus is constructed to strip entire material cores. According to this embodiment, the apparatus includes a pair of bracket and arm assemblies 70. The bracket and arm assemblies 70 are not attached to the frame 42. In FIG. 3, they are permanently mounted to the floor. The bracket and arm assembly 70 includes a pair of cam follower bearings 72 and 74 on each arm 76. The cam follower bearings 72 and 74 cradle the pipe (not shown) which supports an entire material core between the arms 76. In operation, the pipe (not shown) which is longer than the distance between the arms 76 is placed through the center of the metal cylinder of the material core 55. The pipe ends which extend beyond the ends of the material core are cradled in the cam follower bearings 72 and 74. Thus, the material core 55 is suspended between the arms 76 by the pipe. The leading edge of the material is fed into first nip 60 which then proceeds to pull the remaining material from the material core. Thus, entire material rolls are quickly and cost effectively stripped by the invention.

We claim:

1. An apparatus for stripping material from a material core, comprising:
    a. a frame;
    b. a belt attached to the frame;
    c. means for rotationally driving the belt; and
    d. means for biasing material to be stripped against the belt, said biasing means including a plurality of positioning members attached to the frame and spaced at intervals such that the distance between each positioning member is greater than the diameter of the material core to be stripped, wherein each of the positioning members frictionally engages the belt to form a nip.

2. The apparatus of claim 1 wherein the belt is an endless conveying belt.

3. The apparatus of claim 1 wherein the means for rotationally driving the belt includes a motor and gear box with speed controlled through an A/C variable frequency drive.

4. An apparatus for stripping the material from a plurality of material cores simultaneously, comprising:
    a. a frame;
    b. an endless conveying belt attached to the frame, the endless conveying belt including a top runner and a bottom runner;
    c. a driver engaging the endless conveying belt to rotationally drive the endless conveying belt;
    d. at least one support attached to the frame for supporting the top runner; and
    e. at least one positioning member attached to the frame, wherein the positioning member biases the material to be stripped from the material core against the conveying belt top runner, wherein the positioning member is rotatably attached to the frame and frictionally engages the top runner of the conveying belt to form a nip.

5. The apparatus of claim 4 wherein the positioning member is rotatably attached to the frame and frictionally engages the top runner of the conveying belt to form a nip.

6. The apparatus of claim 4, wherein the support is rotatably attached to the frame.

7. The apparatus of claim 4 wherein the conveying belt is rubberized.

8. An apparatus for stripping paper from a plurality of paper cores simultaneously, comprising:
    a. a frame;
    b. an endless conveying belt attached to the frame, the endless conveying belt including a top runner and a bottom runner;
    c. a driver engaging the endless conveying belt to rotationally drive the endless conveying belt;
    d. a plurality of support members rotatably attached to the frame for supporting the top runner; and
    e. a plurality of positioning members rotatably attached to the frame at selected intervals such that the distance between each of the positioning members is greater than the diameter of the paper core to be stripped, each positioning member frictionally engaging the top runner of the conveying belt to form a nip.

9. The apparatus of claim 8 wherein the apparatus includes support members attached to the frame to support material cores being stripped.

10. The apparatus of claim 8 wherein the conveying belt is rubberized.

11. The apparatus of claim 8 wherein the nip pulls from the material core.

12. The apparatus of claim 8 further including a discharge roller rotatably attached to the frame to frictionally engage the top surface of the conveying belt to form a discharge nip.

13. The apparatus of claim 12 wherein the discharge nip discharges the material stripped from the paper cores directly into a paper shredding and baling machine.

14. The apparatus of claim 13 further including a discharge photo sensor attached to the frame.

15. The apparatus of claim 14 wherein the discharge photo sensor is electrically connected to an electrical circuit which controls the paper shredding and baling machine.

* * * * *